United States Patent [19]
Pollard et al.

[11] 3,763,715
[45] Oct. 9, 1973

[54] AUXILIARY TIGHTENER FOR FAN BELTS ON AUTOMOBILE ENGINES

[76] Inventors: Michael H. Pollard, 5957 Calico Ln., Canfield, Ohio 44406; Robert G. Donnan, 143 N. Navarre Ave., Youngstown, Ohio 44515

[22] Filed: Mar. 30, 1972

[21] Appl. No.: 239,683

[52] U.S. Cl. 74/242.1 A, 74/242.11 A, 74/242.14 R
[51] Int. Cl. ............................................. F16h 7/10
[58] Field of Search ........... 74/242.11 R, 242.11 A, 74/242.11 C, 242.14 R, 242.1 A

[56] References Cited
UNITED STATES PATENTS
2,010,056   8/1935   Brush.............................. 74/242.1 A Primary Examiner—Leonard H. Gerin
Attorney—Webster B. Harpman

[57] ABSTRACT

An auxiliary tightener for fan belts on automobile engines consists of an idler pulley on a movable mounting bracket located in the normal path of a fan belt on an automobile engine so as to relocate the path of the fan belt and thus enable the regular adjustable tensioning device to be effective in maintaining working tension on said belt.

In some automobile engines having overhead cam shafts milling the head to increase the compression ratio in the engine results in lowering the cam shaft to a position where the usual fan belt which drives the cam shaft, is incapable of maintaining proper frictional engagement with the drive pulleys of the engine. On such engines the use of the auxiliary tightener enables the cam shaft to be properly driven and the timing of the engine to be set as desired.

3 Claims, 4 Drawing Figures

3,763,715

AUXILIARY TIGHTENER FOR FAN BELTS ON AUTOMOBILE ENGINES

BACKGROUND OF THE INVENTION

1. Field of the Invention

This invention relates to auxiliary tighteners for fan belts as used on automobile engines and wherein the path of a fan belt is to be altered so as to compensate for respositioning of the drive and driven pulleys over which the fan belt is trained.

2. Description of the Prior Art

Prior structures of this type are found in the following U.S. Pat. No. 1,828,769, wherein a pair of idlers are movable relative to a belt path; No. 1,689,750, No. 3,364,282, No. 3,585,250 and No. 3,361,000 illustrate more or less conventional belt tightening arrangements all of which provide for the adjustment of a single idler arranged to tension the fan belt. The several patents disclose adjustable belt idler supports. The present invention adds an auxiliary tightener in the path of a conventional fan belt still trained over a drive and driven pulley and a conventional adjustable idler pulley. Only through the use of the present invention can certain automobile engines be modified and the timing maintained.

SUMMARY OF THE INVENTION

In automobile engines, such as the Chevrolet Vega, the cam shaft actuating the valves of the engine is located overhead, that is to say in the head of the engine and in the Vega engine it is driven by the fan belt which in turn is driven from the end of the crank shaft and also drives the radiator fan. A conventional belt tensioning idler is incorporated in the Vega engine and as manufactured the engine operates successfully.

When the head of a Vega engine is milled to remove some metal therefrom so as to decrease the area within the combustion chambers in the head the cam shaft and its driving pulley are moved downwardly toward the driving pulley on the crank shaft. Under such condition no commercially available fan belt will properly interconnect the cam shaft driving pulley with the crank shaft driving pulley and the engine cannot be operated because it cannot be timed. By utilizing the device of the present invention, which consists of mounting an auxiliary tightener in the normal fan belt path so that the belt can be trained thereover, the normal adjustability of the cam shaft is again available and the conventional fan belt is capable of driving the same as well as the radiator fan and alternator assembly. The auxiliary tightener bolts to the head of the engine and enables a Vega engine with a milled head and an increased compression ratio to be successfully and satisfactorily operated.

DESCRIPTION OF THE PREFERRED EMBODIMENT

In its simplest form the auxiliary tightener for fan belts on automobile engines consists of an L-shaped body member having right angular portions 10 and 11 which portions stand vertically and are apertured for the reception of a plurality of fasteners 12 by which the body member is attached to the head 13 of an internal combustion engine.

Figure 1:
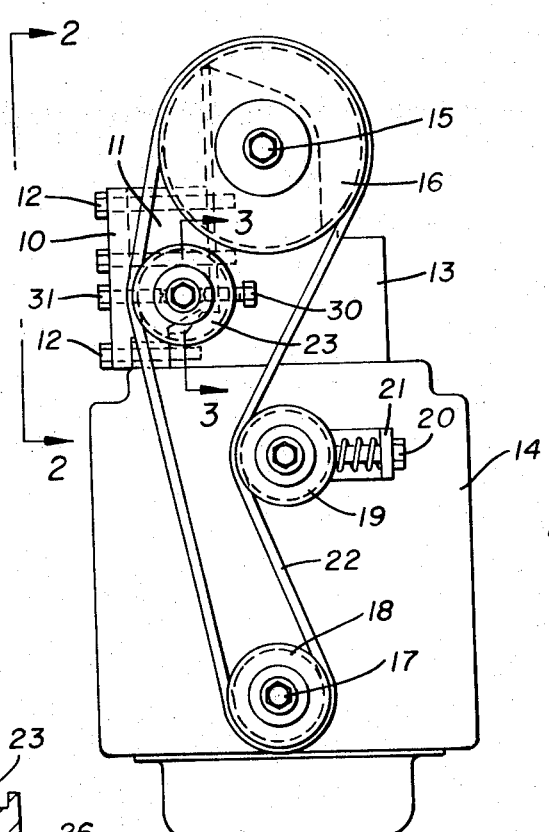
FIG. 1 is a front plan view of an internal combustion engine with the auxiliary tightener shown in position thereon with a fan belt trained thereover.

By referring to FIG. 1 of the drawings, it will be seen that the head 13 is mounted on the block 14 of the engine and that the head journals a cam shaft 15, one end of which extends outwardly thereof and is provided with a driving pulley 16 which may incorporate sprocket teeth as known in the art.

Still referring to FIG. 1 of the drawings, it will be seen that the engine block 14 of the internal combustion engine has one end of a crank shaft 17 extending therefrom and the same is equipped with a driving pulley 18. A fan belt tensioning and idling adjustment is regularly provided and it is illustrated as consisting of an idler pulley 19 adjustably positioned by a screw 20 with respect to a bracket 21 mounted on the block 14 of the engine. A fan belt 22 is shown positioned over the driving pulley 16 and 18 on the cam shaft and crank shaft respectively and engaged by the idler pulley 19.

In FIG. 1 of the drawings, the auxiliary tightener is illustrated and includes an auxiliary tensioning pulley 23 which is journeled for rotary motion on a shaft 24 and secured thereto by a fastener 25.

Figure 3:
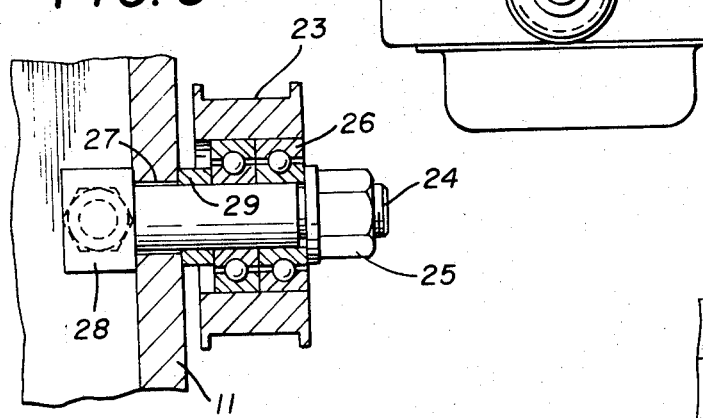
FIG. 3 is an enlarged detailed section on line 3—3 of FIG. 1.
Figure 4:
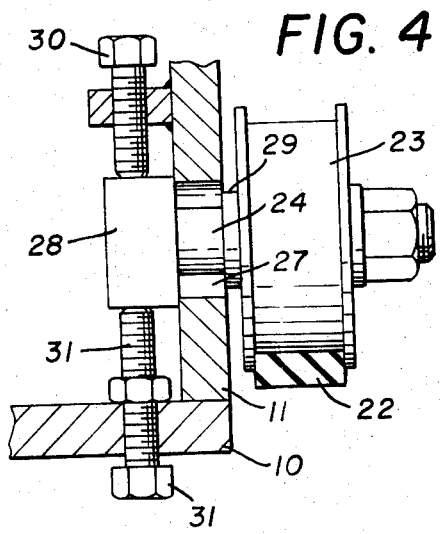
FIG. 4 is an enlarged detailed elevation on line 4—4 of FIG. 2.
Figure 2:
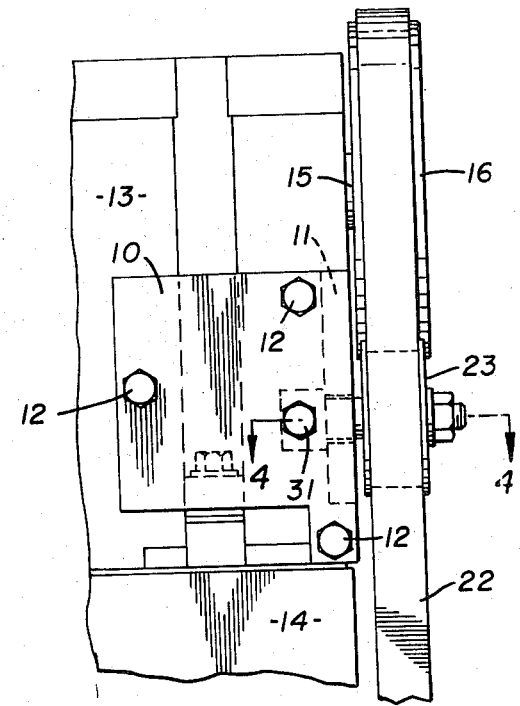
FIG. 2 is a side elevation on line 2—2 of FIG. 1.

As seen in FIG. 3 of the drawings, the auxiliary tightener 23 incorporates antifriction bearings 26 so that it will rotate freely on the shaft 24. The shaft 24 slidably engages a slot 27 in the portion 11 of the L-shaped body member which as hereinbefore noted is secured to the head 13 by fasteners 12. A block 28 is attached to one end of the shaft 24 and positioned on the opposite side of the portion 11 of the L-shaped body member with respect to the auxiliary pulley 23 and a washer-like body member 29 is positioned between the bearing 26 and the vertical portion 11 of the L-shaped body member so that the shaft 24 is movable horizontally in the slot 27 and thereby mounts the auxiliary pulley 23 for such horizontal motion. In order that the shaft 24 and the auxiliary pulley 23 can be fixed with respect to the head 13 secondary screws 30 and 31 are respectively positioned through threaded openings in a secondary bracket 31 on the portion 11 of the L-shaped body member and in the portion 10 thereof as best seen in FIG. 4 of the drawings.

It will thus be obvious to those skilled in the art that by rotating the secondary screws 30 and 31 the auxiliary pulley 23 may be moved relative to the path of the belt 22 and thereby tension the same so as to enable the motion of the crank shaft 17 of the engine to be properly imparted to the cam shaft 15. As hereinbefore noted the belt 22 and the several pulleys concerned may be provided with registering teeth as known in the art so that positive timing of the engine may be assured.

It will thus be seen that an auxiliary tightener for a fan belt on an automobile engine has been disclosed which will permit the head of the engine to be milled so as to move the cam shaft and crank shaft closer to one another and so that a driving belt interconnecting the cam shaft and crank shaft by pulleys thereon can be operatively and adjustably engaged therewith as necessary to properly time said engine by adjusting a relative position of said cam shaft.

Having thus described our invention what we claim is:

1. Adjustment means for adjusting the tension in a flexible drive means interconnecting a crank shaft and an overhead cam shaft of an overhead cam internal combustion engine to impart rotary motion of the crankshaft to the camshaft, comprising an engine block, a head on the engine block, a crankshaft in a lower portion of the engine block, a pulley on a forward end portion of said crankshaft at the forward end of the engine, a camshaft in the head of the engine, a pulley at the forward end portion of said camshaft at the forward end of the engine, a flexible drive means trained over the pulleys and connecting the pulleys together for imparting rotary motion of the crankshaft to the camshaft, a first bracket secured to the forward end of the engine block to one side of a straight line extended between the axes of the said pulleys, an idler pulley mounted on said bracket and engaged with an outer portion of the flexible drive means to take up slack in the flexible drive means resulting from normal wear, a second bracket secured to a forward end portion of said head of said engine near said pulley on said camshaft and on the opposite side of the line extended between the axes of the pulleys, an adjustment pulley mounted on said second bracket and engaged with said flexible drive means at an inner portion thereof, and adjustment means connected with said adjustment pulley to adjust the position of the adjustment pulley relative to the flexible drive means independently of adjustment of the idler pulley to compensate for changes in the distance between the crankshaft and camshaft resulting, for example, from milling the head of the engine.

2. Adjustment means as in claim 1 wherein said flexible drive means comprises a fan belt, said second bracket is apertured, fastening means extend through the apertures into the head, said second bracket having a slot therein, a shaft extended through said slot, said adjustment pulley rotatably mounted on the shaft, and means on the second bracket holding said shaft and pulley in a desired adjusted position in the slot.

3. The adjustment means as in claim 1 and wherein said means on said second bracket consists of set screws arranged in opposed position on either side of said shaft.

* * * * *